United States Patent [19]

Schellinger et al.

[11] Patent Number: 5,442,680
[45] Date of Patent: Aug. 15, 1995

[54] DUAL SYSTEM CELLULAR CORDLESS RADIOTELEPHONE APPARATUS WITH SUB-DATA CHANNEL TIMING MONITOR

[75] Inventors: Michael J. Schellinger, Vernon Hills; Stefan G. Littig, Arlington Heights, both of Ill.

[73] Assignee: Motorola, Inc., Schaumburg, Ill.

[21] Appl. No.: 296,263

[22] Filed: Aug. 25, 1994

Related U.S. Application Data

[63] Continuation of Ser. No. 903,251, Jun. 23, 1992, abandoned.

[51] Int. Cl.[6] ............................................. H04Q 7/38
[52] U.S. Cl. ........................................ 379/58; 379/59; 379/61; 455/33.1; 455/33.4
[58] Field of Search .................................. 379/58–61, 379/63; 450/33.1, 33.4, 34.1, 34.2, 54.1

[56] References Cited

U.S. PATENT DOCUMENTS

| | | | |
|---|---|---|---|
| 4,644,347 | 2/1987 | Lucas et al. | 455/56.1 |
| 4,972,455 | 11/1990 | Phillips et al. | 379/59 |
| 4,989,230 | 1/1991 | Gillig et al. | 455/56.1 |
| 5,095,529 | 3/1992 | Comroe et al. | 455/17 |
| 5,125,103 | 6/1992 | Grube et al. | 379/63 |
| 5,127,042 | 6/1992 | Gillig et al. | 379/61 |
| 5,212,684 | 5/1993 | MacNamee et al. | 379/61 |

Primary Examiner—Curtis Kuntz
Assistant Examiner—Dwayne D. Bost
Attorney, Agent, or Firm—Dale B. Halling; Donald C. Kordich

[57] ABSTRACT

A cellular cordless telephone may receive cellular telephone calls via a cellular telephone system and receive telephone calls on a system having a limited radio coverage area. To reduce the amount of time spent in monitoring the sub-data channel of the limited coverage area system, a timing signal is generated which represents the period of time spent monitoring the radio channel. During the monitoring, a predetermined number of data words transmitted on the limited radio coverage area radio channel system are received. When a first received data word is detected, an allowed monitoring time value is adjusted to be the sum of the value of the timing signal and the product of a determined number of received words to be detected and the time required for each word. This adjusted value of the monitoring time value is compared to the value of the timing signal and when the adjusted monitoring time value equals or exceeds the timing signal value, the monitoring of the radio channel ceases.

14 Claims, 12 Drawing Sheets

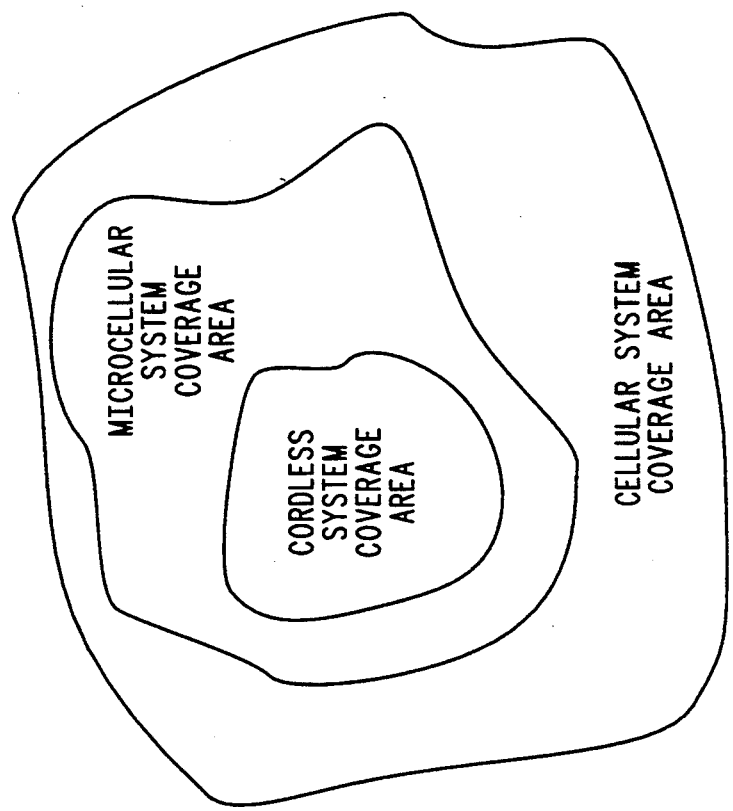
*FIG. 2* —PRIOR ART—
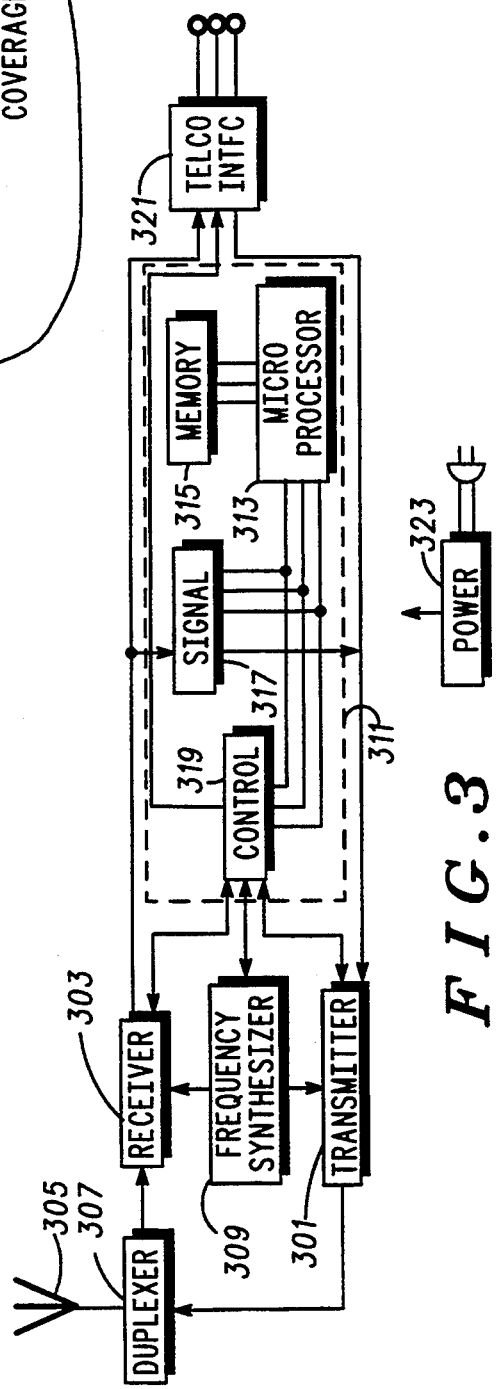
*FIG. 3*

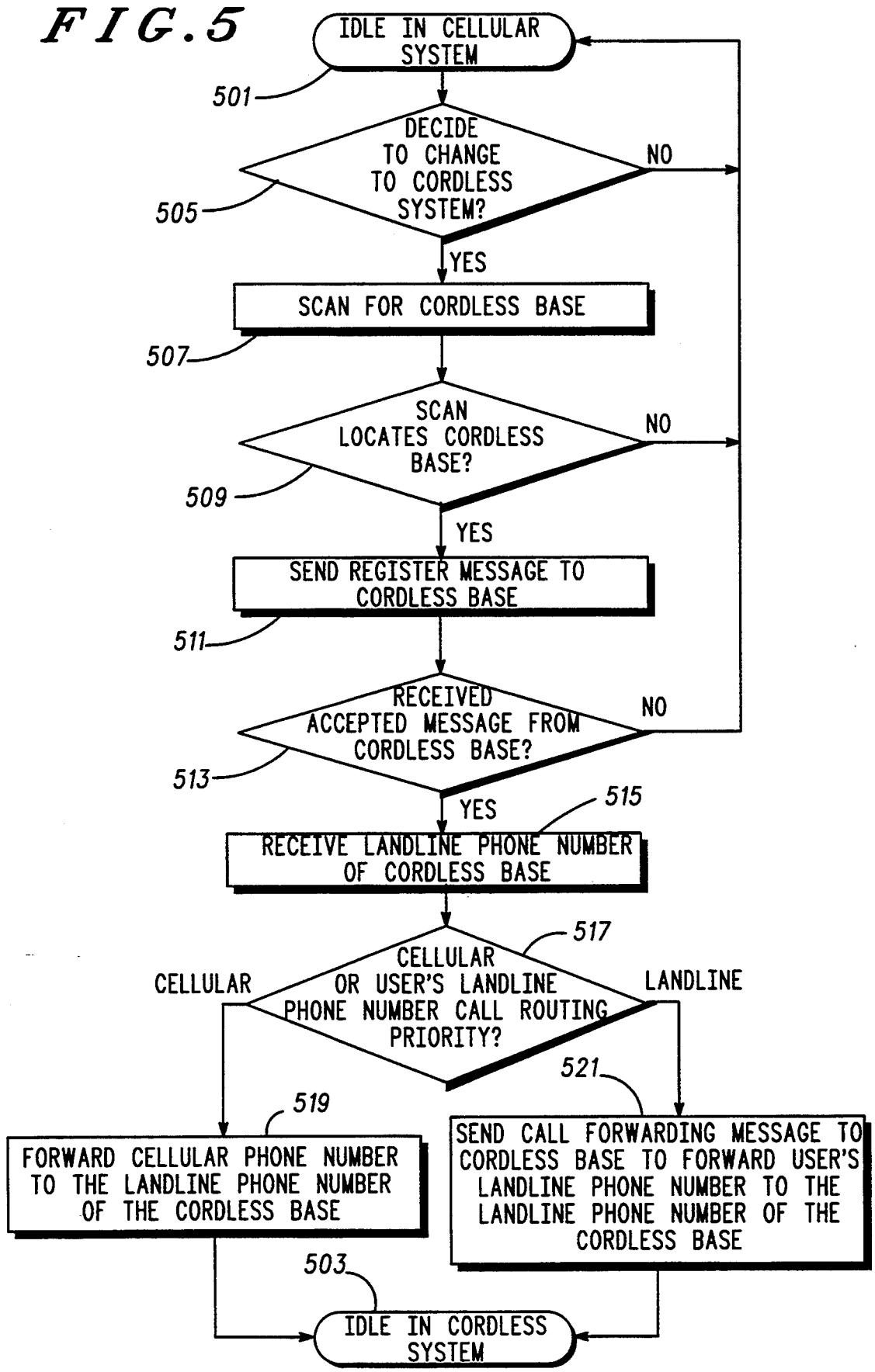

DUAL SYSTEM CELLULAR CORDLESS RADIOTELEPHONE APPARATUS WITH SUB-DATA CHANNEL TIMING MONITOR

This is a continuation of application Ser. No. 07/903,251, filed Jun. 23, 1992, and now abandoned.

FIELD OF THE INVENTION

The present invention relates generally to portable telephones, and more particularly to an improved portable telephone that may receive calls in both cordless and cellular telephone systems.

BACKGROUND OF THE INVENTION

The present invention contains material which is related to application Ser. No. 07/832,118 filed on Feb. 6, 1992, in behalf of Schellinger et al. and assigned to the assignee of the present invention.

A cordless telephone system typically includes a portable cordless handset and a cordless base station connected to a telephone company phone system (TELCO) by telephone landlines. The cordless base station has an assigned landline telephone number that allows the user to place and receive calls using the cordless portable handset within a limited range of the cordless base station, such as in a home. However, due to their limited range, the cordless portable handset provides the user with relatively local radiotelephone communication.

Radiotelephone communication outside the range of the cordless telephone system may also be provided to the user via a cellular telephone system. A cellular telephone system typically includes cellular subscriber units (mobile or portable) and cellular base stations connected to the TELCO via one or more cellular switching networks. Each cellular subscriber unit has an assigned cellular telephone number that allows the user to place and receive calls within a widespread range of the cellular base stations, such as throughout a metropolitan area. However, the cost of using the cellular telephone service is generally greater than the cordless telephone service.

To reduce this problem, a radiotelephone may access both the wide area cellular telephone system and the lower cost cordless base station at the user's home. It is also possible to access a microcellular telephone system in those locations where such a system offers radio coverage.

A radiotelephone which transmits and receives calls in both a cellular and a cordless system should have the capability of selecting a system into which it is to operate. An automatic system selection should be made on parameters advantageous to the user. It is important that the radiotelephone, regardless of which system is selected, not miss calls directed to it.

Accordingly, there is a need for a radiotelephone system that enables a user to receive incoming calls via both a short range system such as a cordless system and a wide area system like a cellular telephone system without excessive loss of incoming calls.

SUMMARY OF THE INVENTION

A radiotelephone apparatus receives messages preferably on a radiotelephone system having a limited radio coverage area and alternatively receives messages on a cellular radiotelephone system having a limited radio coverage area. The telephone apparatus establishes a value for the time to monitor a radio channel associated with the limited coverage area system and commences monitoring that system. A timing signal is generated which represents the period of time spent monitoring the radio channel. During the monitoring, a predetermined number of data words transmitted on the radio channel associated with the limited radio coverage area system are received. When a first received data word is detected, the monitoring time value is readjusted to be the sum of the value of the generated timing signal and the product of a determined number of received words to be detected and a predetermined value of time for each word. This readjusted value of the monitoring time value is compared to the value of the generated timing signal. The monitoring of the radio channel ceases when the readjusted monitoring time value equals or exceeds the generated timing signal value.

BRIEF DESCRIPTION OF THE DRAWINGS

FIG. 2 is a diagrammatical map which shows a typical arrangement of coverage areas for the cordless, microcellular and cellular systems.

FIG. 3 is a block diagram of a cordless base station which may employ the present invention.

FIGS. 5 and 6 are flowcharts for the process used by the portable radiotelephone of FIG. 4 when the portable radiotelephone is not engaged in a call.

DETAILED DESCRIPTION OF A PREFERRED EMBODIMENT

Figure 1:
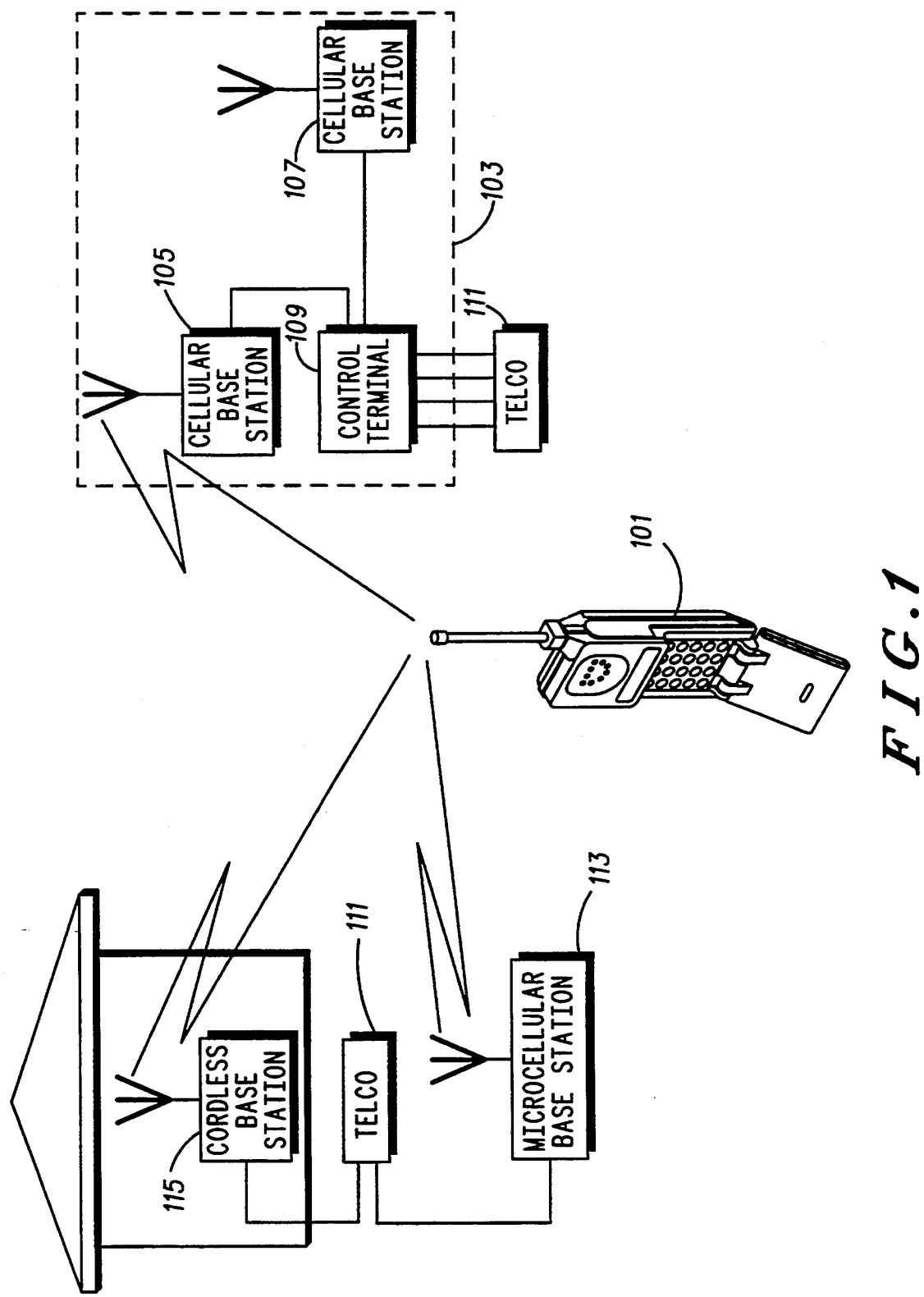
FIG. 1 is a block diagram of an operating configuration for a portable radiotelephone in which several systems, including both a cellular system and a cordless system, may be accessed by the same portable radiotelephone.

A generalized block diagram of an application of the present invention is shown in FIG. 1. A portable cellular cordless (PCC) radiotelephone 101 is shown having the ability to communicate with a conventional cellular radiotelephone system 103, which has a plurality of cellular base stations 105, 107 located at geographically separate locations but arranged to provide radiotelephone coverage over a wide geographic area. The cellular base stations are coupled to a control terminal 109 which provides coordination among the plurality of cellular base stations, including handoff of user cellular mobile and portable equipment, and provides call switching and interconnect to the public switched telephone network (identified hereinafter as "TELCO") 111.

The PCC 101 further has the capacity to communicate with a microcellular base station 113, which is a cellular adjunct cell having lower power and limited capabilities but providing public radiotelephone service to distinct areas such as shopping malls, airports, etc. The microcellular base station 113 is coupled to the TELCO 111 landline telephone system so that calls can be placed to the TELCO.

The PCC 101 further has the capability to communicate with and place radiotelephone calls via a cordless base station 115, which provides private telephone line interconnection to the TELCO 111 for the user of the PCC 101. As previously noted, the cordless base station 115 and the PCC 101 together provide the limited radio range service conventionally known as cordless telephone service. Such service has become pervasive, conventionally using a few radio frequency channels in the HF (high frequency) radio band.

The user of a radiotelephone should expect that radiotelephone service be available wherever he travels in the United States and that this service is provided at the lowest cost. It is also to be expected that radiotelephone service be provided in a portable unit that is as compact and inexpensive as possible. The PCC 101 is uniquely configured to meet this end. Furthermore, the cordless base station 115 is uniquely designed to provide telephone interconnect to the user's home telephone line when the user has the PCC 101 within the radio range of the cordless base station 115.

In addition to tuning to the cellular system signalling channels the PCC 101 will monitor the signalling sub-data channel of the cordless base station 115 for additional information. If the PCC is in an area in which it has accessed normal cellular service on a control channel, then monitoring the sub-data channel involves leaving the cellular system control channel. By leaving the control channel, the PCC may miss important control channel message traffic. (An example message may be a "page" of the cellular phone.) Thus, the time period spent away from the control channel becomes critical as the period gets longer. The present invention enables the PCC to reduce its sub-data channel monitoring time and return to the cellular control channel as soon as possible.

FIG. 2 shows a typical arrangement of coverage areas for the cordless, microcellular, and cellular systems. The cordless system coverage area is the smallest and can reside within the microcellular system. The microcellular system has intermediate coverage and can reside within the cellular system. The coverage area of each system may depend upon, but is not limited to, the number of base stations in each system, antenna height of each base station and the power level used by each system. The user of the PCC may relocate between the various coverage areas. The PCC may change between systems based on but not limited to portable radiotelephone location, system availability, and user preference.

The coverage areas of the systems are not limited to the particular arrangement as shown in FIG. 2. A coverage area may be independent of another coverage area or may partially overlap one or more other coverage areas.

The cordless base station 115, conceptually, is a subminiature cellular system providing a single signalling channel which transmits outbound data messages in a fashion analogous to a conventional cellular outbound signalling channel, and receives service requests from a remote unit, such as a PCC 101. Proper service requests are granted with an assignment of a voice channel (made via the control channel) on the same or a second radio frequency to which the PCC 101 is instructed to tune for its telephone call.

The basic implementation of a cordless base station is shown in FIG. 3. A conventional transmitter 301 and a conventional receiver 303 suitable for use in the 869 to 894 MHz and 824 to 849 MHz band of frequencies, respectively, being used for conventional cellular services, are coupled to a common antenna 305 via a duplexer 307. The power output of the transmitter 301 is limited to approximately 6 milliwatts so that interference to other services and other cordless telephone stations is minimized. The channel frequency selection is implemented by a frequency synthesizer 309 controlled by a logic unit 311. Within the logic unit 311 is a microprocessor 313, such as a 68HC11 available from Motorola, Inc., or similar microprocessor, which is coupled to conventional memory devices 315 which store the microprocessor operating program, base identification (BID) and customizing personality, and other features. Received and transmitted data is encoded/decoded and coupled between the receiver 303, the transmitter 301, and the microprocessor 313 by signalling interface hardware 317. The microprocessor instructions are conveyed and implemented by control hardware 319. Interface with the user's home landline telephone line is conventionally accomplished via a TELCO interface 321. Power is supplied from the conventional AC mains and backed-up with a battery reserve (all depicted as power 323).

Figure 4:
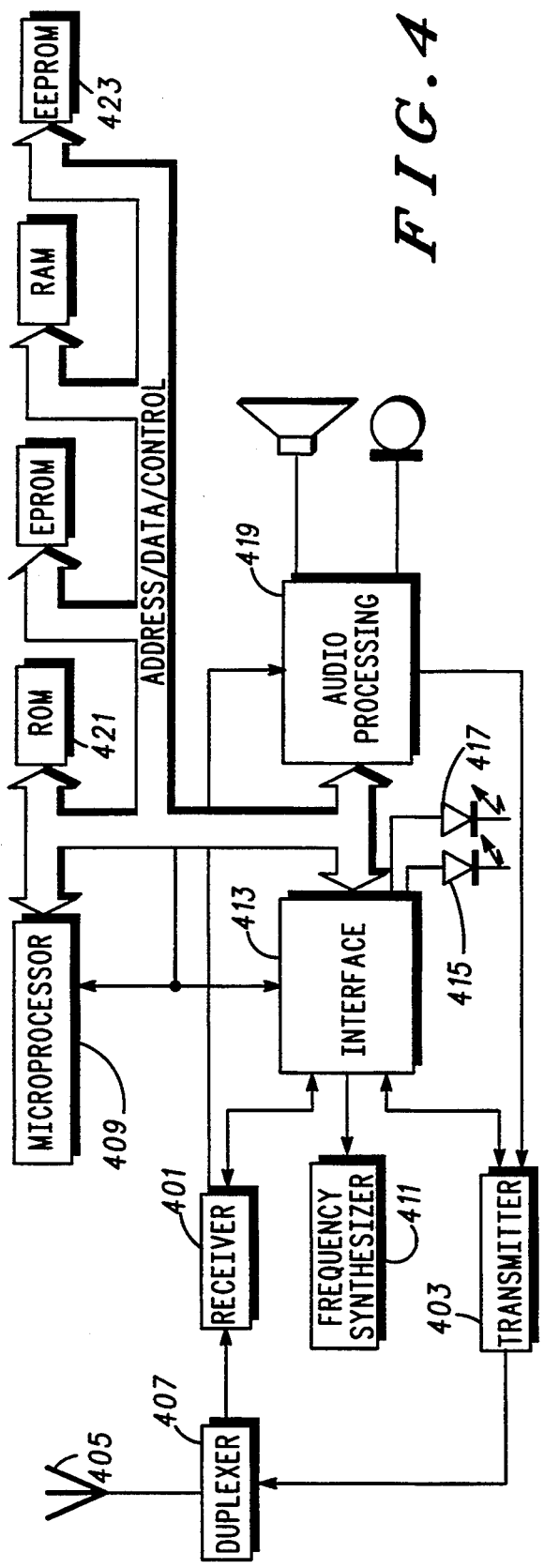
FIG. 4 is a block diagram of a portable radiotelephone which may employ the present invention.

The PCC 101 is a portable radiotelephone transceiver which is shown in block diagram form in FIG. 4. A portable radio receiver 401, capable of receiving the band of frequencies between 869 and 894 MHz, and a portable transmitter 403, capable of transmitting with low power (approximately 6 milliwatts in the preferred embodiment) on frequencies between 824 and 849 MHz, are coupled to the antenna 405 of the PCC 101 by way of a duplexer 407. The particular channel of radio frequency to be used by the transmitter 403 and the receiver 401 is determined by the microprocessor 409 and conveyed to the frequency synthesizer 441 via the interface circuit 413. Data signals received by the receiver 401 are decoded and coupled to the microprocessor 409 by the interface circuit 413 and data signals to be transmitted by the transmitter 403 are generated by the microprocessor 409 and formatted by the interface 413 before being transmitted by the transmitter 403. Operational status of the transmitter 403 and the receiver 401 is enabled or disabled by the interface 413. The interface also controls light emitting diodes, 415 and 417, which are used to indicate to the user which system the PCC 101 is currently receiving. Control of user audio, the microphone output and the speaker input, is controlled by audio processing circuitry 419.

In the preferred embodiment, the microprocessor 409 is a 68HC11 microprocessor, available from Motorola, Inc., and performs the necessary processing functions under control of programs stored in conventional ROM 421. Characterizing features of the PCC 101 are stored in EEPROM 423 (which may also be stored in microprocessor onboard EEPROM) and include the number assignment (NAM) required for operation in a conventional cellular system and the base identification (BID) required for operation with the user's own cordless base.

The transmitter 403 of the PCC 101 has the capability of transmitting with the full range of output power which is required for operation in a conventional cellular system. This range of output power consists of six sets of output power magnitude ranging from a high output power level of approximately 600 milliwatts to a low output power level of 6 milliwatts. This six set range of output power is enabled when the PCC 101 is in the cellular system mode.

According to the preferred embodiment of the present invention, the same PCC 101 is compatible with both the cordless and cellular telephone system 103. This is accomplished by enabling the PCC 101 to operate in both a cordless and cellular telephone system 103 using, in the preferred embodiment, only cellular telephone frequencies.

The radiotelephone arrangement has desirable advantages for the user. Firstly, the PCC 101, in combination with the cordless base station 115, can automatically route an incoming call to the telephone system in which the PCC 101 is located without inconveniencing the user. Secondly, the PCC 101, in combination with the cordless base station 115, can automatically route a call in process with the PCC 101 between the cordless and the cellular telephone systems when the PCC 101 relocates therebetween.

Figure 6:
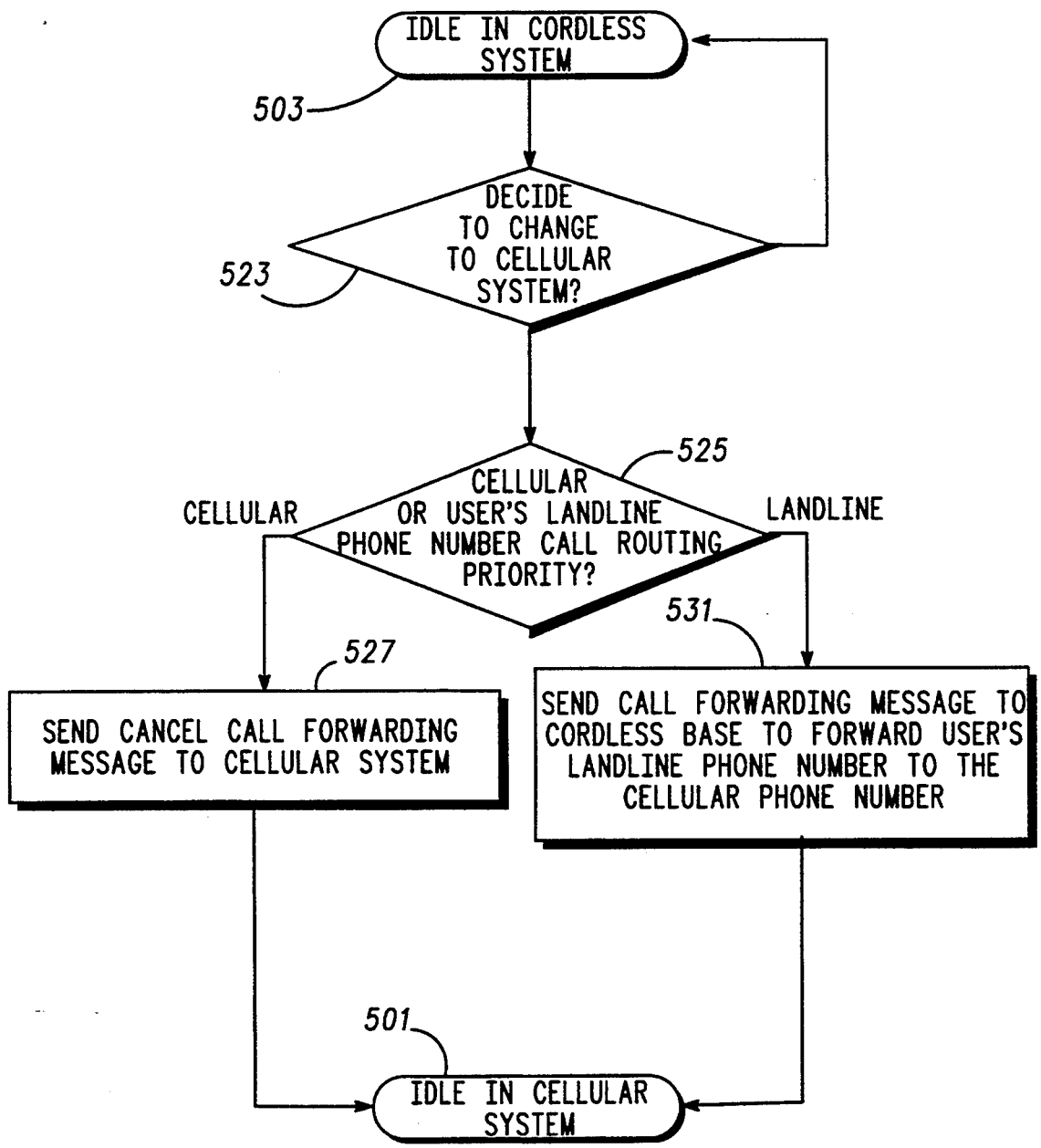

FIG. 5 and FIG. 6 taken together is a flowchart for the process used by the PCC 101 in FIG. 4. In one embodiment of the present invention, the PCC 101 and the cordless base station 115 cooperatively operate, as described in the flowchart of FIGS. 5 and 6 to route an incoming call to the cordless telephone system or the cellular telephone system 103 according to the location of the PCC 101.

As shown in FIG. 5, the PCC 101 may be in an idle state in either the cellular telephone system 103 at block 501 or the cordless telephone system at block 503. In either idle state, the PCC 101 is in a condition to receive an incoming call. For discussion purposes, assume that the PCC 101 is in the idle state in the cellular telephone system 103 at block 501. The PCC 101 decides at block 505 whether to remain in its idle state in the cellular telephone system 103 by returning to block 501 or to change to the cordless telephone system by scanning for an acceptable cordless base station at block 507. If the scan process locates an acceptable cordless base station 115, as determined at block 509, the PCC 101 sends a register message (an attempt by the PCC to register with the cordless base station) to the cordless base station 115 at block 511. Otherwise, the PCC 101 returns to the idle state in the cordless telephone system at block 501.

The cordless base station 115 normally waits in an idle state. Upon receiving the register message, the cordless base station 115 determines if the PCC 101 is acceptable. If the PCC 101 is acceptable, the cordless base station 115 sends an accept message to the PCC 101, sends its own landline telephone number to the PCC 101, and returns to its idle state. If the PCC 101 is not accepted by the cordless base station 115, the cordless base station 115 sends a reject message (a nonregistration of the PCC by the cordless base station) to PCC 101 and returns to its idle state.

In FIG. 5 the PCC 101 determines if the accepted (PCC registration) message is received at block 513. If the accepted message is received, the PCC 101 receives the landline telephone number of the cordless base station 115 at block 515. Otherwise, the PCC 101 returns to its idle state in the cellular telephone system 103 at block 501. Thus, the cordless base station 115 has been notified of the PCC's 101 decision to change to the cordless telephone system and the cordless base station 115 responds by giving the PCC 101 its landline telephone number.

In FIG. 5 the PCC 101 determines whether the user's cellular or landline phone number has call routing priority at block 517. Call routing priority refers to the user's system preference (cellular or landline) to which an incoming call is routed to first before transferring to the second system if the PCC 101 is not located. Since the user is available via both a cellular and landline phone number, it would be convenient to give out only one of the phone numbers to another party to place incoming calls to the user. Thus, a single phone number may be used by the other party to reach the user's PCC 101 in either the cellular or cordless telephone system.

If the cellular phone number has call routing priority, the PCC 101 forwards the cellular phone number to the landline phone number of the cordless base unit at block 519 and waits in the idle state in the cordless telephone system at block 503. Thus, an incoming call routed to the user's cellular phone number is automatically forwarded to the landline phone number of the cordless base station 115 when the PCC 101 is located in the cordless telephone system.

If the user's landline phone number has call routing priority, the PCC 101 sends a call forward message to the cordless base unit instructing it to forward the users landline phone number (sent to the cordless base station) to the landline phone number of the cordless base unit at block 521 and waits in the idle state in the cordless telephone system at block 503. If a call forward message is received by the cordless base station 115, the cordless base station 115 performs a remote call forwarding of the user's landline phone number to the landline phone number of the cordless base station 115 and returns to its idle state. Thus, an incoming call routed to the user's landline phone number is automatically forwarded to the landline phone number of the cordless base station 115 when the PCC 101 is located in the cordless system. If the PCC 101 is turned off the user may still receive incoming calls via any telephone associated with the phone number of the base station.

In FIG. 6 the PCC 101 decides at block 523 whether to remain in its idle state in the cordless telephone system by returning to block 503 or to change to the cellular telephone system 103 by progressing to block 525. At block 525 the PCC 101 determines whether the cellular phone number of the PCC 101 or the user's landline phone number has call routing priority. If the cellular phone number has call routing priority, the PCC 101 sends a cancel call forwarding message to the cellular system and the PCC 101 returns to waiting in the idle state in the cellular system at block 501. Thus, an incoming call routed to the user's cellular phone number directly calls the PCC 101 located in the cellular telephone system 103.

If the user's landline phone number has call routing priority, the PCC 101 sends a call forwarding message to the cordless base station 115 to forward the user's landline phone number for the cellular phone number of the PCC 101 at block 531. If the PCC 101 is unable to establish communication with the cordless base station 115, the PCC 101 can perform the call forwarding by making a cellular telephone call. Thus, an incoming call routed to the user's landline phone number is forwarded to the cellular phone number of the PCC 101 located in the cellular telephone system 103.

The radiotelephone arrangement is not limited to only cellular and cordless telephone systems. The radiotelephone arrangement may operate in at least two radiotelephone systems where it would be desirable for a PCC 101 to switch between the systems. Such desirable reasons may include but are not limited to coverage area, service cost or service quality.

Since at least two systems coexist (the conventional cellular system and the cordless system) and can have overlapping radio coverage, it is important that a priority hierarchy be established. The cordless system is expected to be a lower cost system than the conventional cellular system because it is attached via the user's home landline connection to the TELCO public switched telephone network by conventional wire. It is most likely that the cordless system would be the preferred system when the PCC 101 is within the coverage area of the cordless base station 115. Therefore, in the preferred embodiment, priority is given to the cordless base service. However, the user may select other hierarchy of priority if desired.

Figure 7:
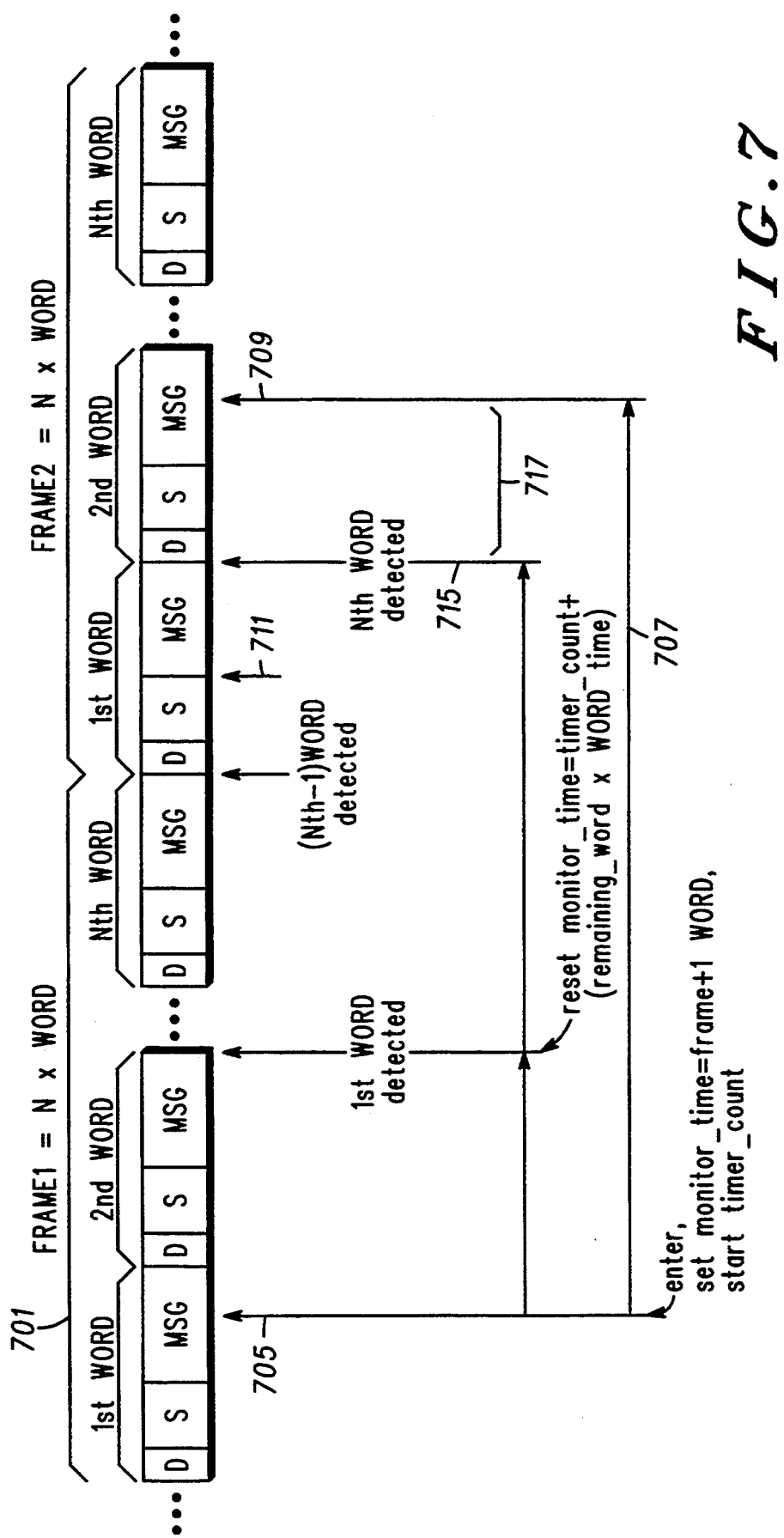
FIG. 7 is a timing diagram of the data format outbound on the sub-data channel from the cordless base station.

The cordless base station 115 transmits an outbound signalling message on a radio channel which is selected to be noninterfering with radio channels in use in the local cellular system 103. This message is similar to that transmitted in the conventional system in that its purpose is to present the identity of the cordless system and aid the PCC 101 in determining its availability. The format of the message outbound from the cordless base station 115 on its signalling channel is shown in FIG. 7. In the preferred embodiment, information is transmitted in words on a radio channel from the cordless base station 115. Each word contains a known predetermined sequence of data bits (S) for synchronization followed by the data bits conveying the message (MSG). Optionally, a word also contains a dotting sequence (D) which precedes the synchronization sequence. Words are repeatedly transmitted on the channel. The dotting and synchronization are transmitted in NRZ while the message is transmitted in Manchester. When scanning, the PCC 101 locks onto a particular channel which may contain information transmitted by the cordless base station 115. If it is not able to decode a word within the time to transmit a certain number of words, it assumes that data is not present on the channel and continues with the scanning process. Since the PCC may arrive on the channel in the middle of a word, it must be on overlapping radio coverage, it is important that a priority hierarchy be established. The cordless system is expected to be a lower cost system than the conventional cellular system because it is attached via the user's home landline connection to the TELCO public switched telephone network by conventional wire. It is most likely that the cordless system would be the preferred system when the PCC 101 is within the coverage area of the cordless base station 115. Therefore, in the preferred embodiment, priority is given to the cordless base service. However, the user may select other hierarchy of priority if desired.

The cordless base station 115 transmits an outbound signalling message on a radio channel which is selected to be noninterfering with radio channels in use in the local cellular system 103. This message is similar to that transmitted in the conventional system in that its purpose is to present the identity of the cordless system and aid the PCC 101 in determining its availability. The format of the message outbound from the cordless base station 115 on its signalling channel is shown in FIG. 7.

In the preferred embodiment, information is transmitted in words on a radio channel from the cordless base station 115. Each word contains a known predetermined sequence of data bits (S) for synchronization followed by the data bits conveying the message (MSG). Optionally, a word also contains a dotting sequence (D) which precedes the synchronization sequence. Words are repeatedly transmitted on the channel. The dotting and synchronization are transmitted in NRZ while the message is transmitted in Manchester. When scanning, the PCC 101 locks onto a particular channel which may contain information transmitted by the cordless base station 115. If it is not able to decode a word within the time to transmit a certain number of words, it assumes that data is not present on the channel and continues with the scanning process. Since the PCC may arrive on the channel in the middle of a word, it must be on the channel for the amount of time to transmit W+1 words to guarantee being on the channel for W complete words. For the purposes of this discussion, the term Frame will be utilized to indicate W words. In the preferred embodiment, the Frame size is two words.

The word message includes a Base Identification (hereinafter, BID) field which operates in a manner similar to the conventional System Identification (hereinafter, SID) in use in cellular systems. The BID is programmed into the cordless base station memory 315 as a number unique to each cordless base station. This unique BID provides the special characterization of each cordless base station so that a user's PCC 101 and cordless base station 115 will operate together without allowing unauthorized users to obtain access.

To provide better security and interference protection, the BID is continuously transmitted subaudibly on the voice channel when voice communication is occurring. The PCC 101 receives and decodes the BID and checks for a match between the subaudibly transmitted BID and the BID of its associated cordless base station 115. So long as the BIDs match, the conversation on the voice channel may continue. Upon detection of a mismatch, the PCC 101 received audio is muted and the PCC transmitter 403 is unkeyed. After a predetermined period of improper BID reception by the PCC 101 and a subsequent lack of received transmission from the PCC 101 to the cordless base station 115, the call is terminated.

Figure 14:
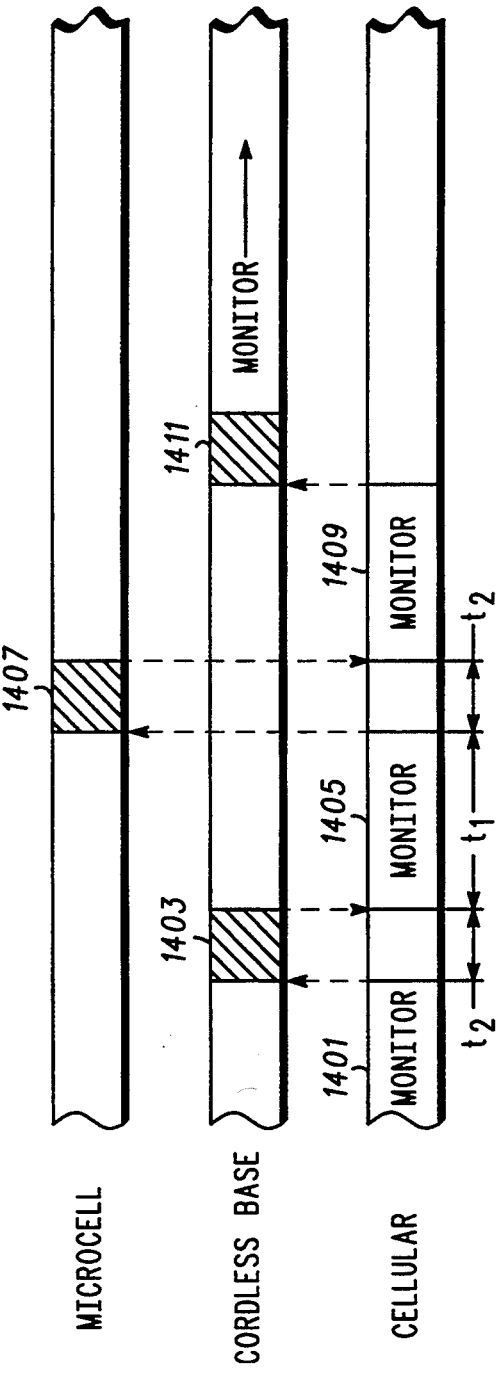
FIG. 14 is a timing diagram of the system scanning process which may be employed in the portable radiotelephone of FIG. 4.

Given that the priority established for the PCC 101 is that the cordless base station 115 is the first desired path for a user's telephone call and the conventional cellular (or the microcell system) is the second choice, the process of implementing that priority is shown in FIG. 14. The depiction in FIG. 14 is of the PCC receiver's 401 reception of the outbound signalling channel or set of signalling channels transmitted from the cellular system, the cordless base, and the microcellular system relative to time. This diagram aids in the understanding of the scanning priority employed in the preferred embodiment of the present invention.

The PCC receiver 401 can be monitoring 1401 the outbound message stream being transmitted from the cellular system signalling channel (which was selected from among the plurality of cellular signalling channels in conventional fashion). At the appropriate time, the PCC receiver 401 is instructed by its microprocessor 409 to tune to the frequency or one of the frequencies being used by the cordless base station 115 as a signalling sub data channel. The PCC receiver 401 scans 1403 the cordless base outbound sub data channel or channels for a period of time $t_2$. If the signalling data stream is not received with sufficient quality, the PCC receiver 401 is retuned to the previously selected signalling channel of the cellular system 103. It remains tuned to this signalling channel 1405 for a period of time, t1, before attempting another scan of a signalling channel of one of the alternative systems. The relationship of t1 and t2 is such that a cellular page message (that is, a radiotelephone call or other transmitted requirement) which is repeated, conventionally, after a 5 second pause will not be missed because the PCC receiver 401 was scanning an alternative system during both cellular page message transmission times. The time $t_1$ must be greater than the sum of the pause between the two pages and the typical time to transmit two pages. The time $t_2$ must be less than the time between the two pages. if the pause time is 5 seconds and the typical time to transmit a page is 185.2 milliseconds, $t_1$ must be greater than the 5.3704 seconds and $t_2$ must be less than 5 seconds. After monitoring the cellular system signalling channel for a time $t_1$, the PCC receiver 401 may be instructed to tune to the signalling channel or to the signalling channels, sequentially, of the microcell system, as shown at 1407. If an adequate microcell signalling channel is not found during the scan of predetermined signalling channel frequencies, the PCC receiver 401 retunes to the cellular system signalling channel, as shown at 1409.

A scan to the signalling sub-data channels, 1411, of the cordless base station 115 which discovers a signalling data stream meeting appropriate quality requirements results in the PCC receiver 401 continuing to monitor the cordless signalling channel. The PCC receiver 401 remains on the cordless signalling channel without rescanning to another system until the PCC 101 cannot receive the cordless base's transmitted signal for a continuous 5 second period of time.

The effect of this priority process is to give priority to the cordless base station 115 at the PCC 101. Once the signalling channel of the cordless base station 115 is discovered, the PCC 101 remains tuned to this channel. Thus, when the PCC 101 is initially tuned to the cellular system it will automatically switch to the cordless base station when it is possible to access the cordless base station. Once the PCC receiver 401 has found the cordless base signalling sub-data channel, it remains tuned to that channel. When the PCC transceiver is first turned on, its first scan of signalling sub-data channels is the preestablished signalling channel or channels of the cordless base station 115. Of course, the user may override the automatic priority scanning hierarchy by entering an override code into the PCC 101. In this manner, the user may force the scanning of the cellular system signalling channels only, the cordless base signalling channels only, the microcellular system signalling channels only, or combinations of the systems. The user may also perform a call origination with a one time override to the system of his choice.

Once the signalling channel of a system is being monitored, a visual indication is given to the PCC transceiver user. In the preferred embodiment, this indicator is a set of light emitting diodes (LEDs) 415,417, one of which uniquely illuminates to indicate to which system the PCC transceiver is tuned. Other indicators may alternately be used to convey the same information. For example, a system identifier may appear in the number display of the PCC 101, or a flashing symbol (having different rates of flashing) may be used. Nevertheless, this indication enables the user to determine which system he is in and decide whether he wishes to complete a radiotelephone call in the indicated system.

Figure 11:
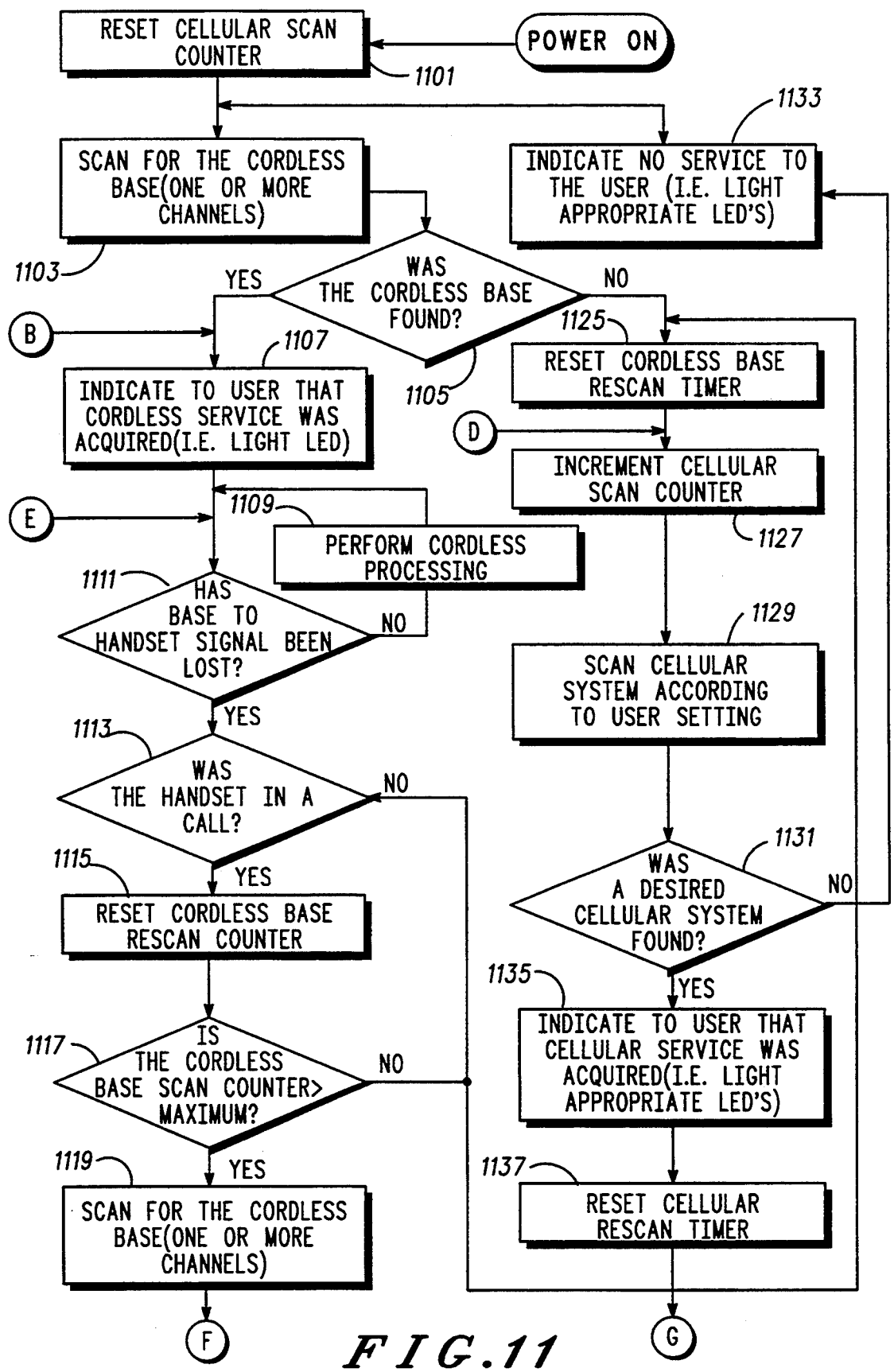
FIG. 11, 12, and 13 are, together, a flowchart diagramming the process of system priority selection which may be employed in the portable radiotelephone of FIG. 4.
Figure 12:
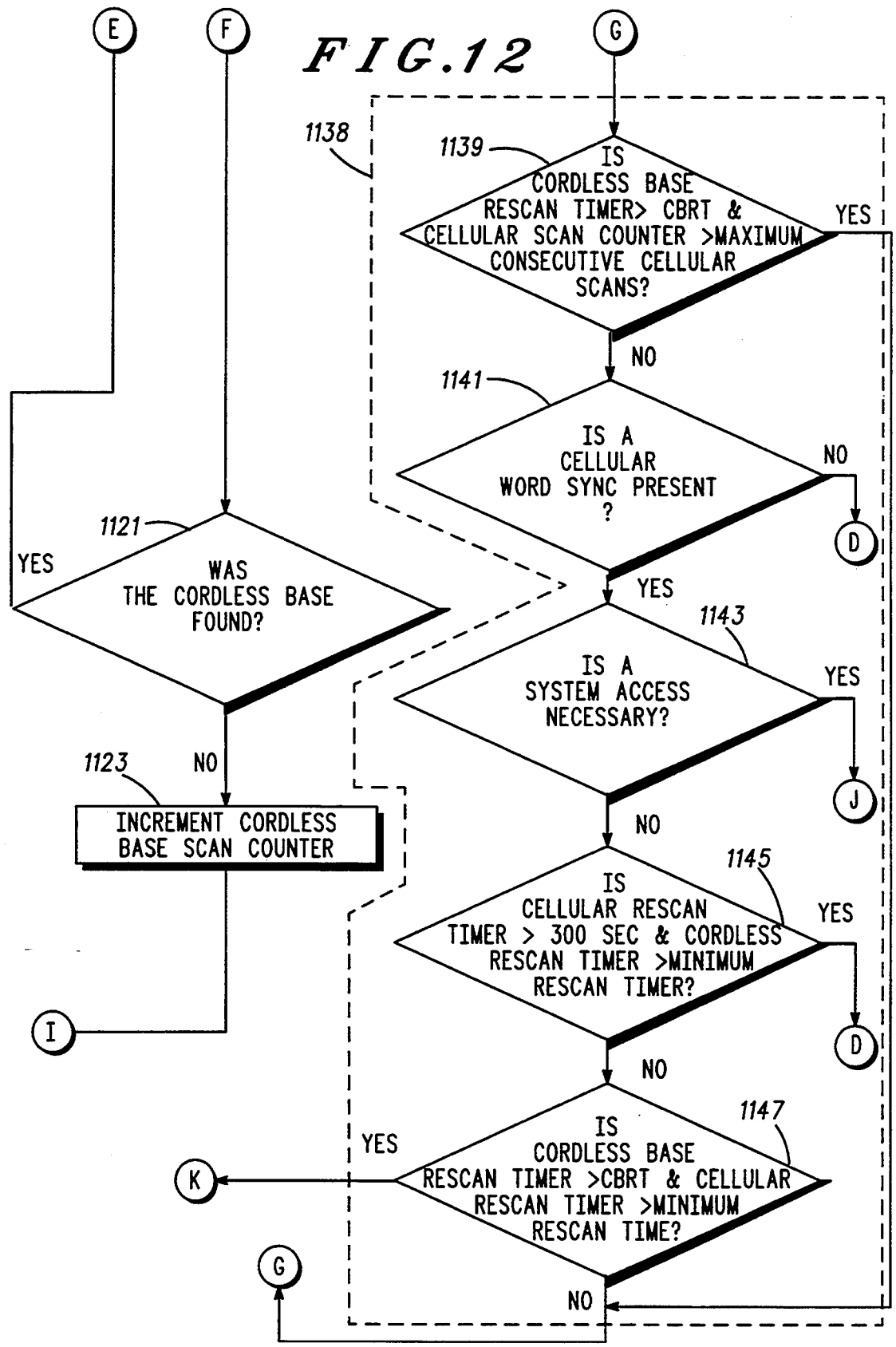
Figure 13:
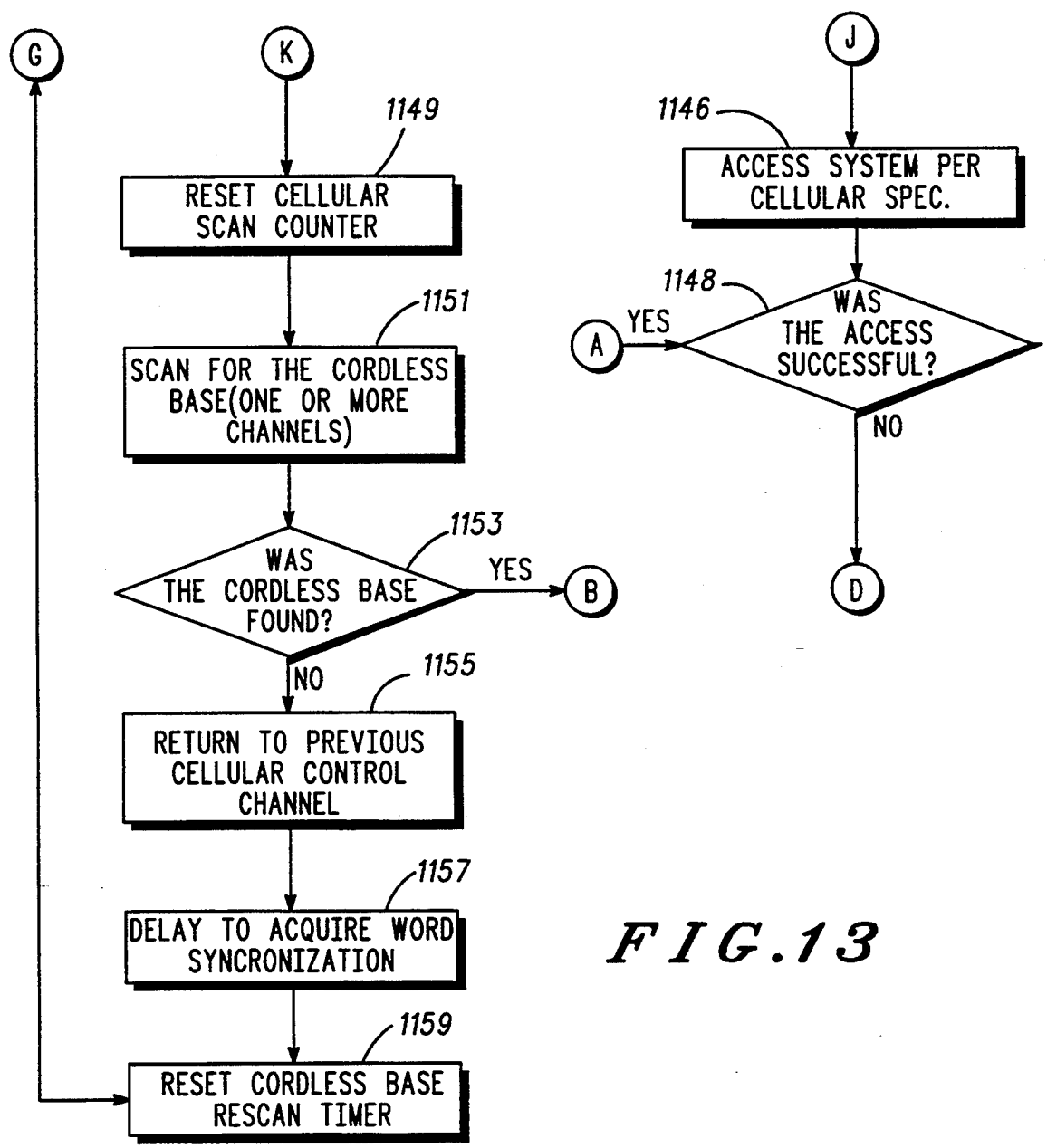

Turning now to FIGS. 11, 12, and 13, the process followed by the PCC 101 in realizing the scan priority is shown in a flow diagram. This process is executed by the microprocessor 409 from its operating program stored in ROM memory 421. Upon power-on, at 1101, the radio sets the cellular scan counter to 0. This variable is utilized to ensure that excessive word synchronization losses or other reasons for excessive cellular rescans do not prevent the PCC 101 from scanning for the cordless base station 115 channels. After resetting the cellular scan counter, the predetermined signalling channel (or channels) of the cordless base station 115 is scanned at 1103 to determine if the PCC 101 is within range of a cordless base station, whether the signalling channel received has the proper BID, and potentially whether the signalling channel has sufficient signal quality. The PCC 101 decides if all the criteria have been met at 1105. If the criteria have been met, the cordless mode of operation is entered and the user is notified by illumination of the LED associated with the cordless mode, at 1107. The PCC transceiver remains in the mode of processing cordless functions, at 1109, including monitoring the cordless base signalling channel, making and receiving radiotelephone calls, and effecting channel change (handoff) between itself and the cordless base, until synchronization or BID is lost between the PCC 101 transceiver and the cordless base station 115 (as detected at 1111).

If synchronization or BID match becomes lost, the process moves to a check of whether the PCC 101 was engaged in a radiotelephone call, at 1113. If the PCC 101 were not in a call, the process moves into a scan of the cellular system signalling channels; if the PCC 101 were engaged in a call, several attempts are made to to engage the call in the cordless mode. The cordless base scan counter is reset at 1115 and is checked at 1117 to determine if the counter has gone beyond the maximum number of cordless base scans (maximum=2 in the preferred embodiment). The cordless channels are scanned at 1119 as described for 1103 and the results are checked at 1121. If the signalling channel from the cordless base station 115 is found, the cordless phone call is resumed. Otherwise, the cordless base scan counter is incremented at 1123 and is rechecked for exceeding the maximum at 1117. If the cordless base scan counter exceeds the maximum, the PCC 101 will abort the cordless mode and will attempt to scan the signalling channels of the cellular system 103.

The cellular scan is begun with process 1125 which is also entered from test 1105. First, the cordless base rescan timer is reset (set to zero) at 1125 to mark the time of the end of the last cordless communication. The cellular scan counter is incremented (1 is added) at 1127 since a cellular scan is about to begin. The PCC 101 scans the cellular system signalling channels, at 1129, according to conventional user settings.

A test is performed at 1131 to determine if an adequate signalling channel is present in the list of cellular signalling channel frequencies scanned by the PCC 101. If no channel is acceptable, a "no svc" LED is illuminated, at 1133, and the process returns to scan the cordless signalling channels at 1101. If a cellular system signalling channel is found to be acceptable, a LED indicating an in service mode is illuminated and all other service provider LED's are extinguished, at 1135. The cellular rescan timer is reset at 1137 to determine the time at which the last cellular rescan was completed. The process then progresses to the modified cellular system "idle task", 1138.

The idle task, 1138, first determines if it is time for a forced cordless rescan at 1139. A forced cordless rescan occurs if the cordless base rescan timer is greater than CBRT. CBRT is the cordless base rescan timeout and is set to 60 seconds in the preferred embodiment. In order for the forced cordless rescan to occur, the cellular scan counter must exceed the maximum number of consecutive cellular scans which is set to 6 in the preferred embodiment. The forcing of the rescan is done since the PCC 101 could get stuck in an endless loop if the check were not there and the radio continuously acquired the cellular channel and lost word synchronization. If the forced cordless rescan is not necessary, the PCC 101 goes to the test at 1141 to determine if cellular word synchronization is present. If word synchronization is not present, the PCC 101 rescans the cellular system by starting at 1127. The resetting of the cordless base rescan timer at 1125 is skipped since the cordless base was not scanned.

If word synchronization is present, a determination of whether a system access is necessary (that is, a call origination, a call page response, or other directed cellular system access) is made at 1143. If a system access is necessary an attempt is made to conventionally access the cellular system at 1146. A successful access results in a post power on return to the process. An unsuccessful access, such as a reception of a page request but an unsuccessful attempt to respond, as determined at 1148, results in a return to the cellular system signalling channel scan.

If a system access was not deemed necessary at 1143, a test is performed at 1145 to determine if a cellular rescan should occur. A cellular rescan occurs if the cellular rescan timer exceeds 300 seconds and the cordless rescan timer exceeds the minimum rescan time. The minimum rescan time is the minimum value of $t_1$ which was 5.3704 seconds in the earlier example. Performing the test of the cordless rescan timer ensures that the PCC 101 has a chance to receive one of the two potential transmissions of the same page. When a cellular rescan occurs, the PCC 101 goes to 1127 thus skipping the resetting of the cordless base rescan timer at 1125.

If the cellular rescan is not necessary, a test is performed at 1147 to determine if a cordless base rescan should occur. A cordless base rescan occurs if the cordless base rescan timer exceeds CBRT and the cellular rescan timer is greater than the minimum rescan time. The minimum rescan time is 5.3704 seconds. Performing the test of the cellular rescan timer ensures that the PCC 101 has a chance to receive one of the two potential transmissions of the same page. The value of CBRT (cordless base rescan timer) must be greater than $t_1$ which is 5.3704 seconds. A value of 60 seconds is picked for CBRT for the preferred embodiment. If a cordless base rescan is not necessary, the process starts back at the beginning of the idle task, 1138. This is the test at 1139.

If a cordless rescan is necessary, the process begins by resetting the cellular scan counter at 1149. This is also the first state of a forced cellular rescan which is decided at 1139. The cellular scan counter is reset at 1149 to assure that a forced cordless scan is not needlessly decided upon at 1139. After the resetting of the cellular scan counter, the signalling sub-data channel or channels of the cordless base station 115 are scanned at 1151 as described for 1103. If the test at 1153 determines that the base was found, the cordless mode is entered and the user is notified at 1107. If the cordless base were not found, the PCC 101 must return to the previous control channel at 1155. It then delays to acquire word synchronization at 1157. The cordless base rescan timer is reset at 1159 to indicate the time that the last cordless base rescan occurred. Finally, the process resumes at the top of the idle task, 1138, at test 1139.

Referring again to FIG. 7, it can be appreciated that the sub-data channel consists of WORD traffic. The sub-data channel WORD has the format of the dotting sequence (D), followed by the synchronization field (S), followed by the subdata channel message (MSG) data bits:

N number of these WORDs constitutes a FRAME.

It is a feature of the present invention that the FRAME helps determine the sub-data channel monitoring time. In order that a cellular system "page" message not be missed during the time period the PCC is scanning for the signalling sub-data channel of the cordless base station, the monitoring time must be less than $t_2$. The shorter the time period, the lower the likelihood a cellular "page" will be missed. When the PCC leaves the control channel of the cellular system and attempts to acquire the sub-data channel from which one FRAME of data may be obtained, the following sequence of events can be expected to occur. Under ideal conditions, the PCC acquires the sub-data channel at the beginning of a WORD such that the WORD is detected. This yields a necessary monitoring time of one FRAME time, that is, the minimum monitoring time required to receive a FRAME:

Minimum monitoring time=FRAME time.

Under other than ideal conditions the PCC acquires the sub-data channel sometime (705) during a WORD such that the WORD is not detected. This yields a monitoring time of one FRAME time plus one WORD time, that is, the duration 707 until the next FRAME and the next WORD. The maximum monitoring time required to receive a FRAME is:

Maximum monitoring time=FRAME time+1 WORD time.

The preceding conclusions are based on certain ideal conditions. However, under real world conditions an infinite number of scenarios may be played out. Nevertheless, the sub-data channel monitoring time should fall within the following limits:

FRAME time<monitoring time<FRAME time+1 WORD time.

Still further refinements of the existing conditions may be applied when determining the sub-data channel monitoring time. The two scenarios worth examining are the ideal conditions and the other than ideal conditions.

Ideal Conditions

There are two points of interest, the entry point and the exit point. First, consider the entry point. The entry point is largely determined by when the radio acquires the sub-data channel. Under ideal conditions the radio would acquire the sub-data channel and detect the first WORD, yielding the following monitoring time:

monitoring time=FRAME time

Considering the dotting (D) sequence which may not be essential to detecting a valid WORD (depending on the WORD detection algorithm) the monitoring time may be reduced to yield the following:

monitoring time=(−DOTTING time)+FRAME time

Next, consider the exit point. The exit point time may be determined by receiving an entire FRAME of data. However, if the synchronization (S) of the last WORD of a FRAME cannot be detected (depending on the WORD detection algorithm) then the monitoring time may be reduced by the message (MSG) time, yielding the following:

monitoring time=(-DOTTING time) +FRAME time - (WORD time - MESSAGE time)

This is the minimum sub-data channel monitoring time.

Other Than Ideal Conditions

Again, there are two points of interest, the entry point and the exit point. First, consider the entry point. The entry point is largely determined by when the radio acquires the sub-data channel. As stated previously, under other than ideal conditions the cellular radio would acquire the sub-data channel somewhere 705 in a WORD such that the word is not detected. Under worst case conditions the entire WORD may not be detected, yielding the following:

monitoring time=FRAME time+1 WORD time

This is the maximum sub-data channel monitoring time.

Next, consider the exit point (709) when the PCC exits the sub-data channel. (It should be noted, of course, that if the PCC detects a WORD having a message or BID which is desired, the PCC will remain tuned to that sub-data signalling channel and not return to the cellular system). The exit point time may be determined by receiving an entire FRAME of data.

However, if the SYNC of the last WORD of a FRAME cannot be detected (depending on the WORD detection algorithm) then the monitoring time may be reduced by the message time (MSG) of the last message since the lack of synchronization (S) makes the MSG portion of the last word undetectable. The return may then occur at time 711; the subdata channel is not of suitable quality. thus:

monitoring time=FRAME time+1 WORD time—(WORD time—MESSAGE time)

Hence, examining both the ideal and the other than ideal conditions, the sub-data channel monitoring time may be represented as follows:

(-DOTTING time)+FRAME time—MESSAGE time)≦monitoring time≦FRAME time+1 WORD time

The sub-data channel monitoring time should fall somewhere within the preceding limits.

Again, when examining the monitoring time, the two points of interest are the entry point (705) and exit point (709). The entry point, for the most part is entirely arbitrary, since it is dependent upon leaving the control channel and acquiring the sub-data channel. However, the exit point is controllable from the information provided on the sub-data channel. This information includes, the WORD format and the FRAME format.

Figure 8:
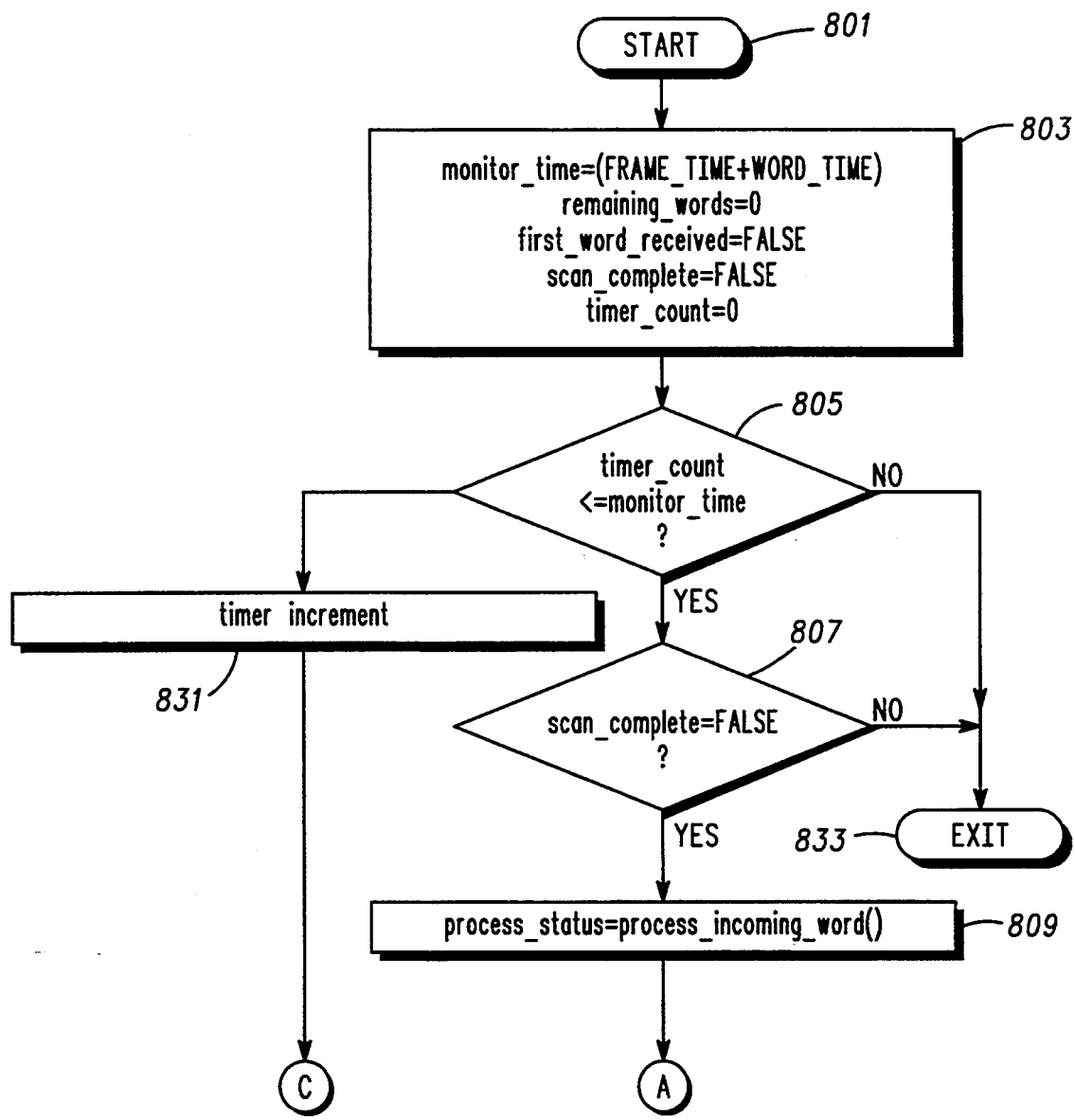
FIGS. 8, 9, and 10, taken together is a flowchart for the process of minimizing the monitoring time of an alternate system channel by the portable radiotelephone of FIG. 4.
Figure 9:
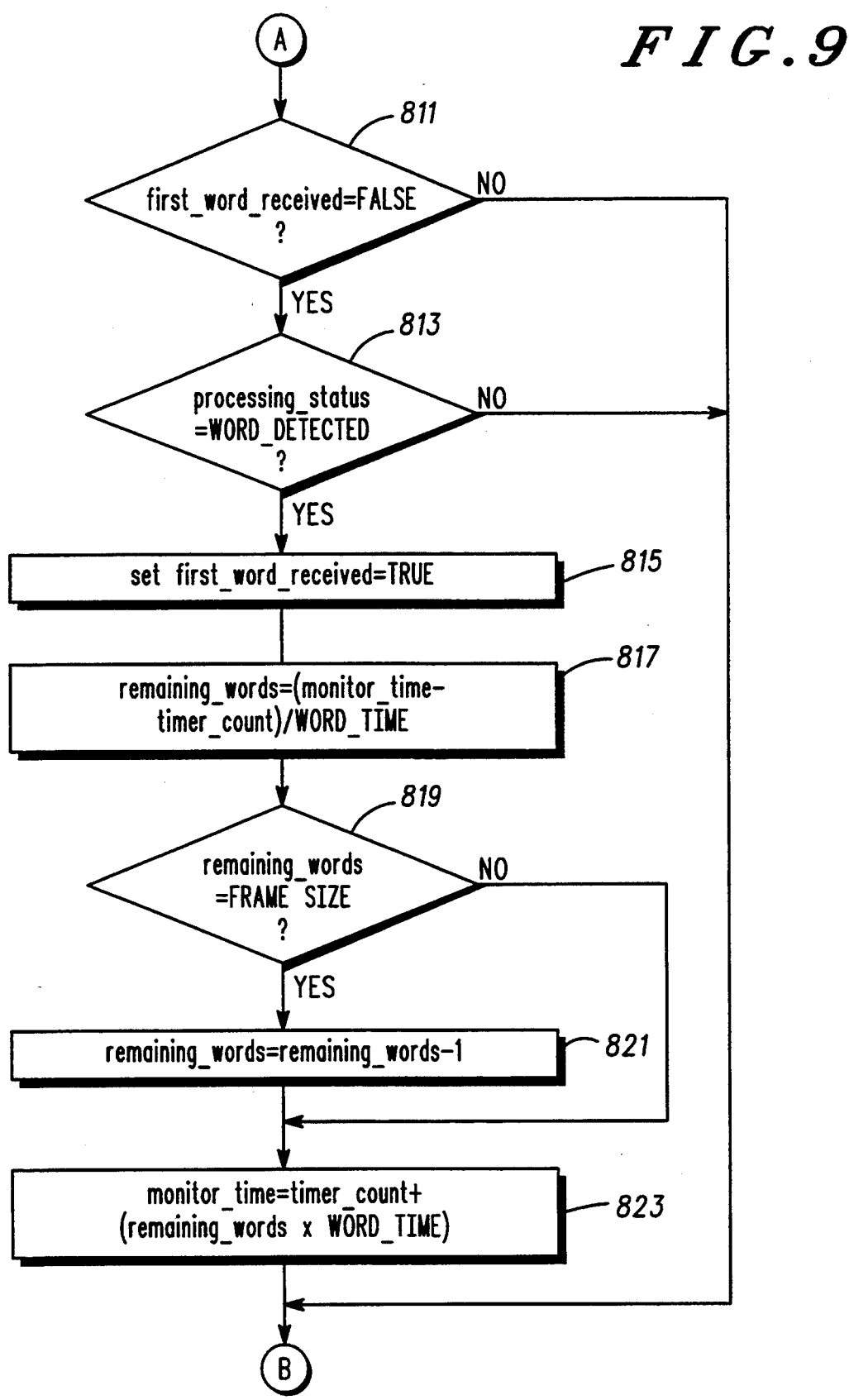
Figure 10:
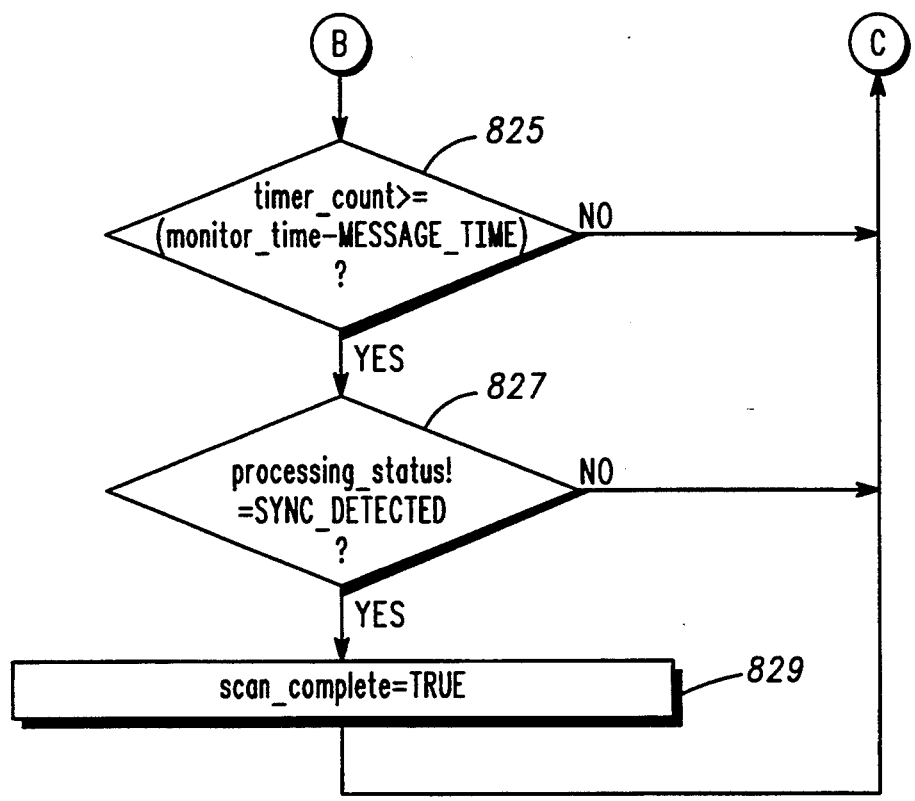

Thus, taking the provided information and the monitoring time limits into consideration, the following process of FIGS. 8, 9, and 10 reduces the sub-data channel monitoring time. The two main functions of this process are:

1) Upon detection of the first word- recalculate the monitoring time. (The monitoring time established the exit point). 2) Upon entry into the last possible WORD, if SYNC can not be detected by the expected time, set the exit condition. (The presence or absence of SYNC in the last WORD may influence the exit point)

FIGS. 8, 9, and 10, taken together, represent a flow chart of the sub-data channel timing monitor process. Upon arriving on the sub-data channel the timing monitor will be initiated at block 801. The first time through, all associated variables are initiated at block 803. The monitoring time (monitor_time) is set to the maximum:

monitor_time=FRAME_TIME+1 WORD_TIME.

The remaining word count (remaining_words) and the timer count (timer_count) are cleared. The first word received (first_word_received) and scan complete (scan_complete) indications are set to FALSE.

The first and subsequent executions of blocks 805 and 807 monitor the various exit conditions. If at block 805 the timer count exceeds the monitoring time or at block 807 a scan complete indication of TRUE is detected and the sub-data channel monitor process is exited at block 833. Else, a processing status of the word detection process is requested at block 809 and processing continues on to block 811.

If at block 811 the first word received indication is FALSE and at block 813 the processing status is equivalent to WORD_DETECTED. The first word received indication is set to TRUE at block 815. To determine the number of words which remain to be detected, the remaining word count is calculated at block 817 (the remaining word count is caused to be represented by an integer value). The remaining word count is calculated from the detection time of the first word, the maximum monitoring time (monitor_time, as defaulted at block 803), and the WORD_TIME (the represented division in the formula is an integer division):

remaining_words=(monitor_time−timer_count)-/WORD_TIME.

Then at block 819 the calculated remaining word count is checked to insure that the count is less than the FRAME_SIZE. If the entry into the data happens to fall at the beginning of a WORD, the ideal condition of equating the monitoring time to the FRAME time may be utilized. If the count is determined, at block 819, to be equal to the FRAME_SIZE, the remaining word count is adjusted at block 821.

The monitoring time is recalculated at block 823. The new monitoring time is calculated using the first word received time (timer_count), the remaining word count (remaining_words), and the WORD_TIME:

monitor_time = timer_count + (remaining_words * WORD_TIME).

The effect of this recalculation is to reduce the period of time spent monitoring the sub-data channel. As shown diagrammatically in FIG. 7, the exit point 709 is moved in time to exit point 715, thereby reducing the monitor time by the difference in time 717 between the original exit point 709 and the recalculated exit point 715. (The monitoring time is used at block 805 for exit determination). Once recalculated, processing will continue on to block 825. Else, if at block 811 the first word received indication is TRUE, or at block 811 the first word indication is FALSE and at block 813 the processing status does not indicate a WORD_DETECTED, the processing continues to block 825.

At block 825, if the timer count is greater than or equal to the monitor time minus the MESSAGE_TIME and the processing status at block 827 indicates that SYNC_DETECTED is not TRUE i.e. the synchronization (S) of the last possible WORD cannot be detected, the scan complete indication is set to TRUE, at 829. This results in the monitoring time being reduced by moving the exit point from point 715 to the new exit point 711 diagrammed in FIG. 7. Processing continues to block 831 for a timer increment and the entire process is repeated starting with block 805. Else, if the timer count at block 825 is less than the monitor time minus the MESSAGE_TIME, or the timer count at block 825 is greater than or equal to the monitor time minus the MESSAGE_TIME and the processing status at block 827 indicates that SYNC_DETECTED is TRUE, processing continues to block 831 for a timer increment and the entire process is repeated starting with block 805.

We claim:

1. A radiotelephone apparatus which receives messages preferably on a first radiotelephone system having a limited radio coverage area and which alternatively receives messages on a second radiotelephone system having a wide radio coverage area, the radiotelephone apparatus interrupting its monitoring of messages from the second radiotelephone system in order to monitor the first radiotelephone system for messages the radiotelephone apparatus comprising:

means for establishing a monitoring time value;

means for monitoring for a period of time a radio channel associated with the first radiotelephone system;

means for generating a timing signal whereby the period of time spent monitoring said radio channel is measured;

means for receiving during said monitoring a predetermined number of data words transmitted on said radio channel associated with said first radiotelephone system;

means for detecting a first received data word;

means for readjusting said monitoring time value to be the sum of the value of said generated timing signal and the product of a determined number of received words to be detected and a predetermined value of time for each word;

means for incrementing said timing signal by a predetermined value:

means for comparing the value of said readjusted monitoring time value to the value of said incremented generated timing signal; and means for ceasing monitoring of said radio channel when said readjusted monitoring time value equals or exceeds said incremented generated timing signal value, and returning to the second radiotelephone system.

2. A radiotelephone apparatus in accordance with claim 1 further comprising means for calculating said determined number of words to be detected, said means for calculating including means for generating a difference value between said generated timing signal and said established monitoring time value and means for rounding said generated difference value to the integer value equal to or less than said generated difference value.

3. A radiotelephone apparatus in accordance with claim 1 further comprising:

means for determining that the last data word is being received;

means for determining that said last data word cannot be detected; and means, responsive to said determination that said last word cannot be detected, for ceasing monitoring of said radio channel.

4. A method of channel monitoring time period reduction for a radiotelephone apparatus which receives messages preferably on a first radiotelephone system having a limited radio coverage area and which alternatively receives messages on a second radiotelephone system having a wide range coverage area, the radiotelephone apparatus interrupting its monitoring of the method comprising the steps of:

establishing a monitoring time value;

monitoring for a period of time a radio channel associated with the first radiotelephone system;

generating a timing signal whereby the period of time spent monitoring said radio channel is measured:

receiving, during said monitoring, a predetermined number of data words transmitted on said radio channel associated with said first radiotelephone system;

detecting a first received data word;

readjusting said monitoring time value to be the sum of the value of said generated timing signal and the product of a determined number of received words to be detected and a predetermined value of time for each word;

incrementing said timing signal by a predetermined value;

comparing the value of said readjusted monitoring time value to the value of said incremented generated timing signal; and ceasing monitoring of said radio channel when said readjusted monitoring time value equals or exceeds said incremented generated timing signal value, and returning to the second radiotelephone system.

5. A method in accordance with the method of claim 4 further comprising the step of calculating said determined number of words to be detected by generating a difference value between said generated timing signal and said established monitoring time value and by rounding said generated difference value to the integer value equal to or less than said generated difference value.

6. A method in accordance with the method of claim 4 comprising the steps of:
- determining that the last data word is being received;
- determining that said last data word cannot be detected; and
- ceasing said monitoring of said radio channel in response to said determination that said last word cannot be detected.

7. A radiotelephone apparatus which receives messages preferably on a first radiotelephone system having a limited radio coverage area and which alternatively receives messages on a second radiotelephone system having a wide radio coverage area, the radiotelephone apparatus interrupting its monitoring of messages from the second radiotelephone system in order to monitor the first radiotelephone system for messages the radiotelephone apparatus comprising:
- means for monitoring for a predetermined monitoring time value a channel associated with the first radiotelephone system;
- means for generating a timing signal;
- means for receiving during said monitoring a predetermined number of data words transmitted on said channel associated with said first radiotelephone system;
- means, responsive to said monitoring time value and said generated timing signal, for determining that a last data word is being received;
- means for determining that said last data word cannot be detected; and
- means, responsive to said determination that said last word cannot be detected, for ceasing monitoring of said radio channel, and returning to the second radiotelephone system.

8. A method of channel monitoring time period reduction for a radiotelephone apparatus which receives messages preferably on a first radiotelephone system having a limited radio coverage area and which alternatively receives messages on a second radiotelephone system having a wide radio coverage area, the radiotelephone apparatus interrupting its monitoring of messages from the second radiotelephone system in order to monitor the first radiotelephone system for messages the method comprising the steps of:
- monitoring for a predetermined monitoring time value a channel associated with the first radiotelephone system;
- generating a timing signal;
- receiving, during said monitoring, a predetermined number of data words transmitted on said channel associated with said first radiotelephone system;
- determining, in response to said monitoring time value and said generated timing signal, that a last data word is being received;
- determining that said last data word cannot be detected; and
- ceasing monitoring of said radio channel in response to said determination that said last word cannot be detected, and returning to the second radiotelephone system.

9. A radiotelephone apparatus which receives messages preferably on a first radiotelephone system having a limited radio coverage area and which alternatively receives messages on a second radiotelephone system having a wide radio coverage area, the radiotelephone apparatus interrupting its monitoring of messages from the second radiotelephone system in order to monitor the first radiotelephone system for messages the radiotelephone apparatus comprising:
- means for monitoring for a predetermined monitor time a channel associated with the first radiotelephone system;
- means for generating a timing signal;
- means for receiving a data word from said channel associated with the first radiotelephone system;
- means, responsive to said data word being received by said means for receiving, for readjusting said predetermined monitor time into a monitor time value related to said timing signal and a determined number of data words to be received from said channel associated with the first radiotelephone system;
- means for incrementing said timing signal by a predetermined value to produce an incremental timing signal;
- means for comparing said readjusted monitor time value to said incremented timing signal; and
- means for ceasing monitoring of said channel associated with the first radiotelephone system when said monitor time value exceeds said incremented timing signal, and returning to the second radiotelephone system.

10. A radiotelephone apparatus in accordance with claim 9 further comprising means for calculating said determined number of words to be detected, said means for calculating including means for generating a difference value between said timing signal and said monitor time and means for rounding said generated difference value to the integer value equal to or less than said generated difference value.

11. A radiotelephone apparatus in accordance with claim 9 further comprising:
- means for determining that a last data word is being received;
- means for determining that said last data word cannot be detected; and
- means, responsive to said determination that said last word cannot be detected, for ceasing monitoring of said channel associated with the first radiotelephone system.

12. A method of channel monitoring time period reduction for a radiotelephone apparatus which receives messages preferably on a first radiotelephone system having a limited radio coverage area and which alternatively receives messages on a second radiotelephone system having a wide radio coverage area, the method comprising the steps of:
- monitoring, for a predetermined monitor time, a channel associated with the first radiotelephone system;
- generating a timing signal;
- receiving a data word from said channel associated with the first radiotelephone system;
- readjusting said predetermined monitor time into a monitor time value related to said timing signal and a determined number of data words to be received from said channel associated with the first radiotelephone system;
- incrementing said timing signal by a predetermined value to produce an incremented timing signal;
- comparing said readjusted monitor time value to said incremented timing signal; and
- ceasing monitoring of said channel associated with the first radiotelephone system when said monitor time value exceeds said incremented timing signal, and returning to the second radiotelephone system.

13. A method in accordance with the method of claim 12 further comprising the step of calculating said determined number of words to be detected by generating a difference value between said timing signal and said monitor time and by rounding said generated difference value to the integer value equal to or less than said generated difference value.

14. A method in accordance with the method of claim 12 comprising the steps of:
determining that a last data word is being received;
determining that said last data word cannot be detected; and
ceasing said monitoring of said channel in response to said determination that said last word cannot be detected.

* * * * *

UNITED STATES PATENT AND TRADEMARK OFFICE
CERTIFICATE OF CORRECTION

PATENT NO. : 5,442,680
DATED : August 15, 1995
INVENTOR(S) : Schellinger et al.

It is certified that error appears in the above-indentified patent and that said Letters Patent is hereby corrected as shown below:

Column 16:
In Claim 4:

On line 7, after "monitoring of", please insert --messages from the second radiotelephone system in order to monitor the first radiotelephone system for messages--.

Column 18:
In Claim 12:

On line 6, before "the method", please insert --the radiotelepone apparatus interrupting its monitoring of messages from the second radiotelephone system in order to monitor the first radiotelephone system for messages--.

Signed and Sealed this

Twenty-second Day of October, 1996

Attest:

BRUCE LEHMAN

*Attesting Officer*     *Commissioner of Patents and Trademarks*